US012781878B2

(12) United States Patent
Lewellen

(10) Patent No.: US 12,781,878 B2
(45) **Date of Patent: *Nov. 3, 2026**

(54) APPARATUS AND METHOD FOR TRANSPORTING AND LAYING PIPE FOR A PIPELINE

(71) Applicant: JT Lewellen, Houston, TX (US)

(72) Inventor: JT Lewellen, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,877

(22) Filed: Feb. 20, 2023

(65) Prior Publication Data

US 2023/0204130 A1 Jun. 29, 2023

Related U.S. Application Data

(63) Continuation-in-part of application No. 17/557,054, filed on Dec. 21, 2021, now Pat. No. 11,598,450.

(60) Provisional application No. 63/134,513, filed on Jan. 6, 2021.

(51) Int. Cl.
*F16L 1/036* (2006.01)
*F16L 1/06* (2006.01)

(52) U.S. Cl.
CPC ............... *F16L 1/065* (2013.01); *F16L 1/036* (2013.01)

(58) Field of Classification Search
CPC ..... E03F 3/06; F16L 1/065; F16L 1/09; F16L 1/10; F16L 1/0243; F16L 1/028; F16L 1/032; F16L 1/036
See application file for complete search history.

(56) References Cited

U.S. PATENT DOCUMENTS

| | | | | |
|---|---|---|---|---|
| 3,969,905 A * | 7/1976 | Dolza | ..................... | F16L 1/036 414/746.4 |
| 11,598,450 B2 * | 3/2023 | Lewellen | .................. | F16L 1/10 |
| 2024/0401718 A1 * | 12/2024 | Lewellen | ................ | F16L 1/065 |
| 2024/0426398 A1 * | 12/2024 | Lewellen | .................. | E21B 7/20 |

FOREIGN PATENT DOCUMENTS

DE 202013012405 * 10/2016

OTHER PUBLICATIONS

FR 2514854 (Year: 1983).*

* cited by examiner

*Primary Examiner* — Sunil Singh
(74) *Attorney, Agent, or Firm* — Karen B. Tripp

(57) ABSTRACT

A programmable and remotely operated and controlled pipe laying apparatus and method of using it for transporting and laying pipe for a pipeline, that can receive, hold, transfer and/or transport and unload pipe in a ditch or other tight space otherwise requiring a side boom. The apparatus has a mobile platform with a longitudinal central axis. A support extends in an extensible manner from the mobile platform and aligns the weight of the pipe with that longitudinal central axis. A pipe holder is associated with the support to facilitate the receiving, holding, transferring and unloading of the pipe on the mobile platform. The apparatuses can cooperate and work in tandem to carry larger and heavier pipe than a single apparatus can handle.

8 Claims, 8 Drawing Sheets

APPARATUS AND METHOD FOR TRANSPORTING AND LAYING PIPE FOR A PIPELINE

RELATED APPLICATION

This application is a continuation in part of U.S. patent application Ser. No. 17/557,054, filed Dec. 21, 2021, which is incorporated herein by reference in its entirety, and which claims the benefit of U.S. Provisional Patent Application Ser. No. 63/134,513, filed Jan. 6, 2021.

BACKGROUND

1. Field

The present invention relates to pipelines generally comprised of mid-sized and large-sized pipes with relatively thick and/or coated-walls usually comprised of metal, metal alloys, or heavy synthetic polymers, that often extend for at least a mile and are known to extend for hundreds of miles. That is, the present invention relates to pipelines for carrying industrial and commercial fluids, such as, for example, hydrocarbons such as oil and oil derivatives, petro-chemicals and other chemical products, and hydrocarbon natural gas and other gases and slurries, which according to their application are often designated respectively as oil pipelines, chemical pipelines, gas pipelines, and slurry pipelines. The present invention is not directed to water mains, aqueducts, or irrigation pipelines, which are usually comprised of smaller-sized pipes and often with plastic walls, for transporting water or sewage in association with public works, or for irrigating agricultural crops and pastures for grazing animals.

More particularly, the present invention relates to installation of such medium and larger pipelines and methods and apparatuses used for that installation. Most specifically, the present invention relates to pipe laying apparatuses and methods for transporting and laying pipe and pipe segments to comprise such medium or larger pipelines for carrying industrial and commercial fluids, particularly oil, gas, and chemicals.

2. Description of Related Art

Pipelines for distributing oil, natural gas, and chemical fluids or slurries, for commercial or industrial use and/or distribution, are comprised of many lengths of individual pipes welded together into pipe segments, which in turn are further welded together to make pipeline sections which are further welded together to make the pipeline.

The pipes and often the pipe segments are typically made off-site, transported to a pipeline installation site, assembled into longer pipeline sections on site, and then moved to and installed at a desired location for the pipeline. Such location can be within a ditch or trench, above ground, or beneath a body of water such as a river, stream, or lake. Longer pipeline sections can also or alternatively be joined together to complete the pipeline after the pipeline sections are in place or are about to be positioned in place, to complete the pipeline assembly and installation.

Pipelines vary in diameter depending on what they are intended to transport. Crude oil pipelines tend to have the largest diameters, typically ranging from about 16 inches to about 42 inches. The TransAlaska oil pipeline which runs 800 miles from Prudhoe Bay to Valdez has a 48 inch diameter. More recently built pipelines transporting heavy crude oil from Western Canada into the United States and toward the Gulf Coast have had pipes of 32 inches or more in diameter. Pipelines that transport hydrocarbon gas liquid tend to be smaller with diameters ranging from about 12 to about 20 inches. Pipelines that transport refined products such as gasoline and diesel tend to be the smallest with diameters ranging from about 6 to about 8 inches.

Currently, an average pipeline has a diameter of over about 26 inches in diameter. The Interstate Natural Gas Association of America has projected that in the future, until about 2035, average diameters for oil, gas and natural gas pipelines are expected to typically be, respectively, 27.6 inches for oil, 29.2 inches for natural gas, and 18.3 inches for natural gas. Pipelines for oil products such as petrochemicals are expected to average 18.3 inches in the near future. <https://www.ingaa.org/File.aspx?id=34658>, last visited Jan. 14, 2023.

Currently, oil, gas, and chemical pipelines are typically buried at depths of about 3 to 6 feet, and are comprised of many pipes welded together. A typical pipe is about 20 feet in length and a typical pipe segment, which is also called a pipe joint, is about 40 feet in length. The pipelines themselves typically extend at least a mile and often can extend for many miles, even hundreds or sometimes thousands of miles.

Not the focus of the present invention are: water mains comprised of concrete; smaller branch water lines comprised of plastics having an interior diameter of about one-half inch up to about 6 inches for providing service to individual homes, offices, buildings, and businesses; and irrigation lines typically having an interior diameter of about ⅛ inch to about 1 inch. Such smaller pipelines and water pipelines are generally easier to handle, and do not involve the same installation procedures or problems as seen with larger oil, gas and chemical pipelines.

The method of laying pipelines comprised of medium and/or large pipes or pipe segments for oil, gas and chemical pipelines in general consists of building pipes, distributing the pipes along their intended path, and assembling the distribution line by connecting the pipes to one another, usually by welding. Many difficulties are encountered in constructing the distribution line in view of the larger size and consequent heavier weight of the pipes that are employed, and the environmental, geographical and weather constraints that must be overcome. Large and heavy equipment is traditionally considered necessary to move and lay the pipes and pipe segments in place.

The traditional method used to assemble medium and larger diameter pipelines intended to carry and oil, gas and related chemicals, or similar commercial and industrial fluids, comprises transporting the pipes or pipe segments of appropriate length for each use to the assembly site where they are placed forming a line (in an arrangement approximately parallel along the course of the pipeline path, typically along the side of a trench for holding the pipe to form the desired pipeline). Side booms then are traditionally needed and used to lower the pipes into the trench usually section by section after the pipes have been welded into segments and/or sections.

Side booms are large tractor type vehicles which carry pipe or pipe segments at the end of a boom or arm. The boom, or arm, extends off a lateral side of the vehicle while counterweights attached to the opposite lateral side of the vehicle offset the weight of the pipe segment and the boom. Caution is required to avoid tipping the side boom over and to avoid dropping the pipe segment from too great a height and damaging the pipe segment. Often, human skilled crew must be dangerously positioned near the side booms to help direct the pipe segment off the side booms. The procedure usually requires numerous side booms and is time consuming and costly and can be hazardous for the crew.

Because new pipelines continue to be needed, and existing pipelines require repair, extension, or replacement, there remains interest in improving the pipe laying process to reduce costs and potential hazards and harms to workers and the environment, and to lessen the time spent in completing the process. Improved methods have been offered and tried, but numerous costly side booms have continued to be needed in laying midsize and large size pipe sections.

SUMMARY

The present invention provides an apparatus for transporting and laying a pipe, pipe segment, or pipe section for a pipeline. The apparatus comprises a mobile platform having a longitudinal central axis and a front end and a rear end for receiving and unloading the pipe, pipe segment or pipe section onto and off of the mobile platform. Said front end and rear end of the mobile platform can be used interchangeably—or vise versa.

The mobile platform of the apparatus of the invention has at least one support configured to align a weight of the pipe, pipe segment, or pipe section with the longitudinal central axis of the mobile platform. That alignment should occur upon the mobile platform's receiving the pipe, pipe segment or pipe section and should continue or be maintained during the holding, transporting and unloading of the pipe, pipe segment, or pipe section at a delivery location.

The apparatus also has at least one pipe holder with a low-friction surface extending from or associated with at least one support for facilitating the receiving, holding, transporting and unloading of said pipe, pipe segment, or pipe section on the mobile platform. In one embodiment, the low-friction surface can be provided with rollers. In another embodiment, the low-friction surface can be provided with lubricant(s).

Caterpillar track(s) or tank treads carry and move the apparatus of the invention and an engine or motor is configured to drive the track or tank treads. This movement can be controlled remotely. That is, the apparatus has a programmable controller that allows remote control of the caterpillar track(s) or tank treads, the engine, the mobile platform, the support(s), and the pipe holder(s) of the apparatus.

The apparatus of the invention further comprises an optional ramp for attaching to an end (front or back) of the mobile platform to aid the uploading or unloading of the pipe, pipe segment or pipe section.

At least one support on the mobile platform is preferably adjustable such that a height position of that support is adjustable with respect to the mobile platform and the pipe holder. In one embodiment having multiple supports that are adjustable or extendable, the adjustments can be made such that the pipe or pipe holder tilts to enable gravity to aid unloading of the pipe, pipe segment or pipe section.

The present invention further provides methods of using the apparatuses of the invention for transporting and laying pipe, pipe segments and pipe sections at a delivery location. Such delivery location can be the intended pipeline location itself, above ground, in a ditch, or underground and accessed in cooperation with directional drilling equipment. Alternatively, such delivery location can be near such intended pipeline location for providing ready access of pipe, pipe segments or pipe sections for constructing the pipeline.

The apparatuses of the invention can be positioned in tandem formation for cooperation in receiving, moving, and unloading pipes, pipe segments, and pipe sections. At such times, alignment of the weight of the pipe, pipe segment, or pipe section with the longitudinal central axis of each of the mobile platforms is maintained.

BRIEF DESCRIPTION OF THE DRAWINGS

The invention can better be understood by reference to the following detailed description when read in conjunction with the accompanying drawings, which are not drawn to scale but are intended to be illustrative, wherein.

DETAILED DESCRIPTION

Figure 1:
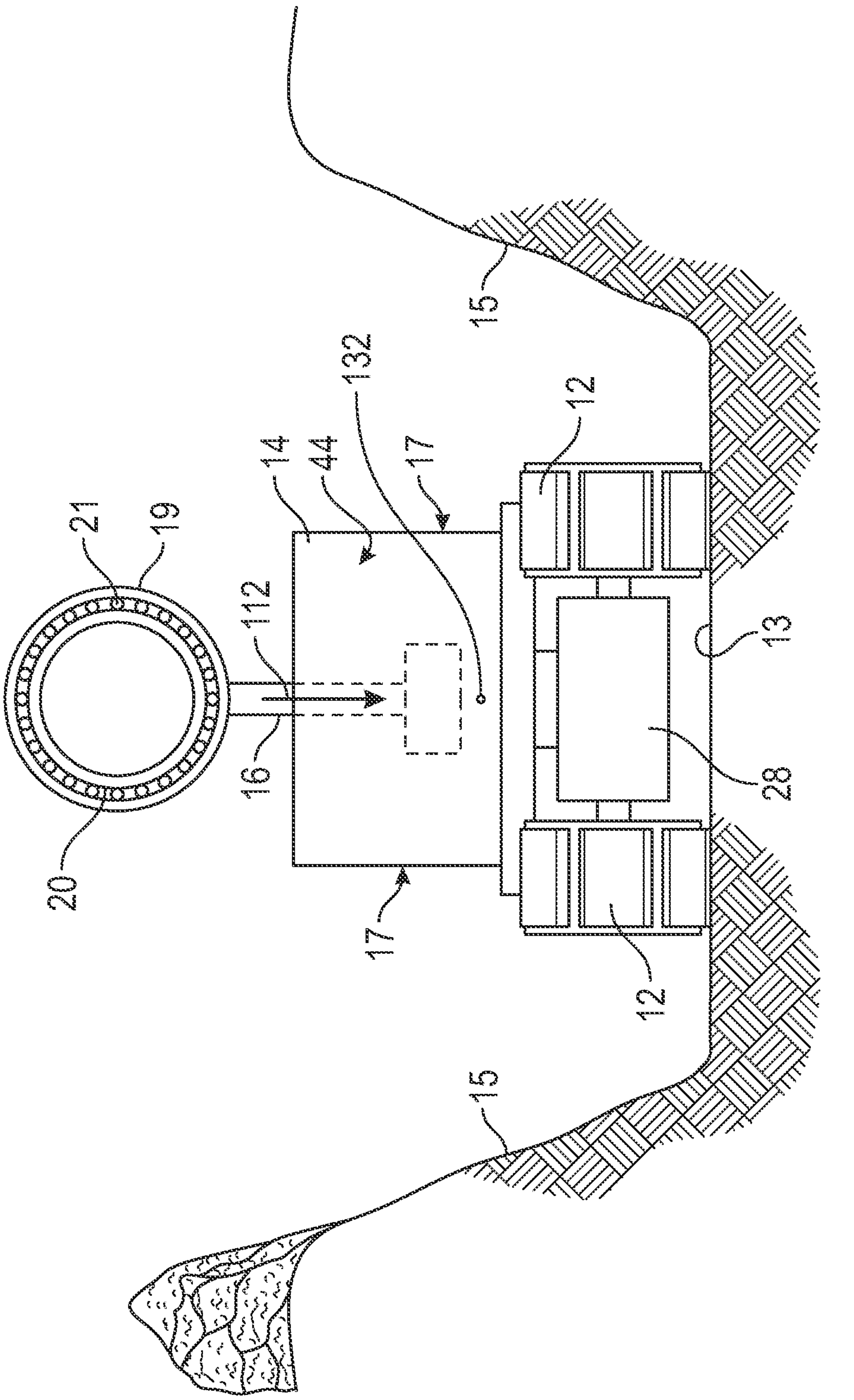
FIG. 1 is an illustration of a first embodiment of the apparatus of the invention shown from an end view having an enclosed, protective encasement pipe holder supported on the mobile platform of the apparatus of the invention.

The present invention provides an apparatus for use in transporting pipe or pipe segments and laying pipe or pipe segments or pipe sections in a trench, beside a trench or at or otherwise above ground level, or near or under a body or water such as in association with directional or horizontal subterranean drilling, that can at least reduce the number of side booms and labor needed for laying, or building, a pipeline, whether the pipeline be new, a section replacement or repair, or an extension. The present invention further comprises a method using apparatus(es) of the invention for transporting and laying pipe, pipe segments, and pipe sections for laying such pipeline.

The apparatus of the invention can be remotely controlled, helping keep workers at safe distances away from the pipe or pipe segment or pipe section during loading, transport and transfer or delivery of the pipe or pipe segment or pipe section. In use, an apparatus of the invention can receive, lift or lower a pipe or pipe segment or pipe section, carry such pipe or pipe segment or pipe section to and/or hold it at a desired location, and then either transfer the pipe or pipe segment or pipe section to another apparatus of the invention or lower the pipe or pipe segment or pipe section into place at the desired location for creating the pipeline. For such transfer or delivery, the apparatus of the invention can be caused to employ controlled assistance from gravity, enabling the apparatus to function efficiently without need for as much if any side boom assistance.

The apparatus of the present invention is much smaller than a side boom and is preferably sized to be no more than about twelve inches wider than and preferably no wider than, or even up to about three to six inches less than, the width of the pipe or pipe segment or pipe section the apparatus is intended to carry. In one embodiment the width of the apparatus of the present invention is adjustable or expandable. Sizing of the apparatus of the invention related to the size pipe or pipe segment or pipe section it is intended to carry enables the apparatus of the invention to be able to fit in a ditch or trench or other location in which the pipe or pipe segment or pipe section is to be placed for comprising the pipeline.

Considering the range of diameters of midsize and large size pipelines in existence and contemplated in the next decade, in one embodiment of the present invention, the apparatus of the invention is provided in three different sizes, one having a width of about twelve inches, one having a width of about twenty four inches and one having a width of about thirty six inches. These three sizes are believed to provide general utility for most of the pipelines contemplated for oil, gas, and petrochemicals, and similar industrial and commercial fluids, particularly containing hydrocarbons or hydrocarbon derivatives.

With reference to the Figures, illustrations of the apparatus of the invention in different embodiments and uses or applications are provided, showing different pipe holders for holding a pipe or pipe segment or pipe section on the mobile platform of the apparatus of the invention. In these illustrative examples, the same reference numerals may be used in more than one Figure. This reuse of a reference numeral in different Figures represents the same element in the different Figures, even though the Figures may illustrate different embodiments of the apparatus of the invention, indicating that such embodiments, albeit different, have some common or like elements.

Referring to the Figures, depicting multiple embodiments of the apparatus of the invention (for illustration and not drawn to scale), the apparatus has caterpillar track or tank treads 12 for ease of movement of the apparatus on soil 13 as is commonly present in a pipeline environment, which is typically a ditch or trench 15 (as shown in FIGS. 1, 3, 5, and 6) or right away adjacent the ditch or trench which may or may not have soil piled on it from digging of such ditch or trench. Wheels or skids could be substituted for the caterpillar track or tank treads 12, for use on harder ground in the environment such as, for example, pavement, or ice and/or mud respectively.

The caterpillar track or tank treads 12 carry a mobile platform 14 of the apparatus of the invention, which has at least one support 16 extending therefrom for supporting the pipe or pipe segment 20. As used herein, the term "mobile platform" is understood to include a single platform or multiple platforms associated together to have the effect of a single platform for purposes of supporting the pipe or pipe segment 20 or pipe section 60 on the apparatus of the invention.

Support 16 has associated with it or extending from it a pipe holder, which holds and supports the pipe or pipe segment or pipe section on the apparatus for receipt or uploading, transport, delivery and unloading and/or offloading of the pipe or pipe segment or pipe section. The pipe holder is configured to align weight 112 of pipe or pipe segment 20 or pipe section 60 with the longitudinal central axis 132 of the apparatus of the invention as the apparatus receives and/or uploads, holds, transports, and transfers or unloads and/or offloads a pipe or pipe segment or a pipe section. The longitudinal central axis 132 can be defined as the linear axis positioned equidistant from the two lateral sides 17 of the mobile platform 14. The weight 112 of the pipe or pipe segment is advantageously not carried to the side of apparatus of the invention as is done with a side boom. Weight 112 is represented in the FIGS. 1, 2, 3, and 5 with arrows.

The pipe holder on the apparatus of the invention has the functions discussed above, even though it can be different in different embodiments of the apparatus of the invention as illustrated in the FIGS. 1-5 and discussed below, referring to pipe holders 19, 22, 24, and 25, in FIGS. 1, 2, 3, and 5 respectively.

In one embodiment, the pipe holder is comprised of an encasement 19 for pipe or pipe segment 20 it encases, which such encasement can be a larger diameter encasing pipe as shown in FIG. 1 having a length slightly less than or about the same as the pipe or pipe segment 20, with interior rollers 21 about its interior circumference. This encasement pipe holder 19 receives, protects, holds, and supports, the pipe or pipe segment 20 while the interior rollers 21 help facilitate movement of the pipe or pipe segment 20 during receipt or uploading and unloading the pipe or pipe segment 20. In one embodiment, such encasement pipe holder 19 of FIG. 1 can be removed and replaced with a different sized diameter but otherwise like or similar encasement pipe holder so that the apparatus can be readily adapted for holding different diameter pipes or pipe segments.

Figure 2:
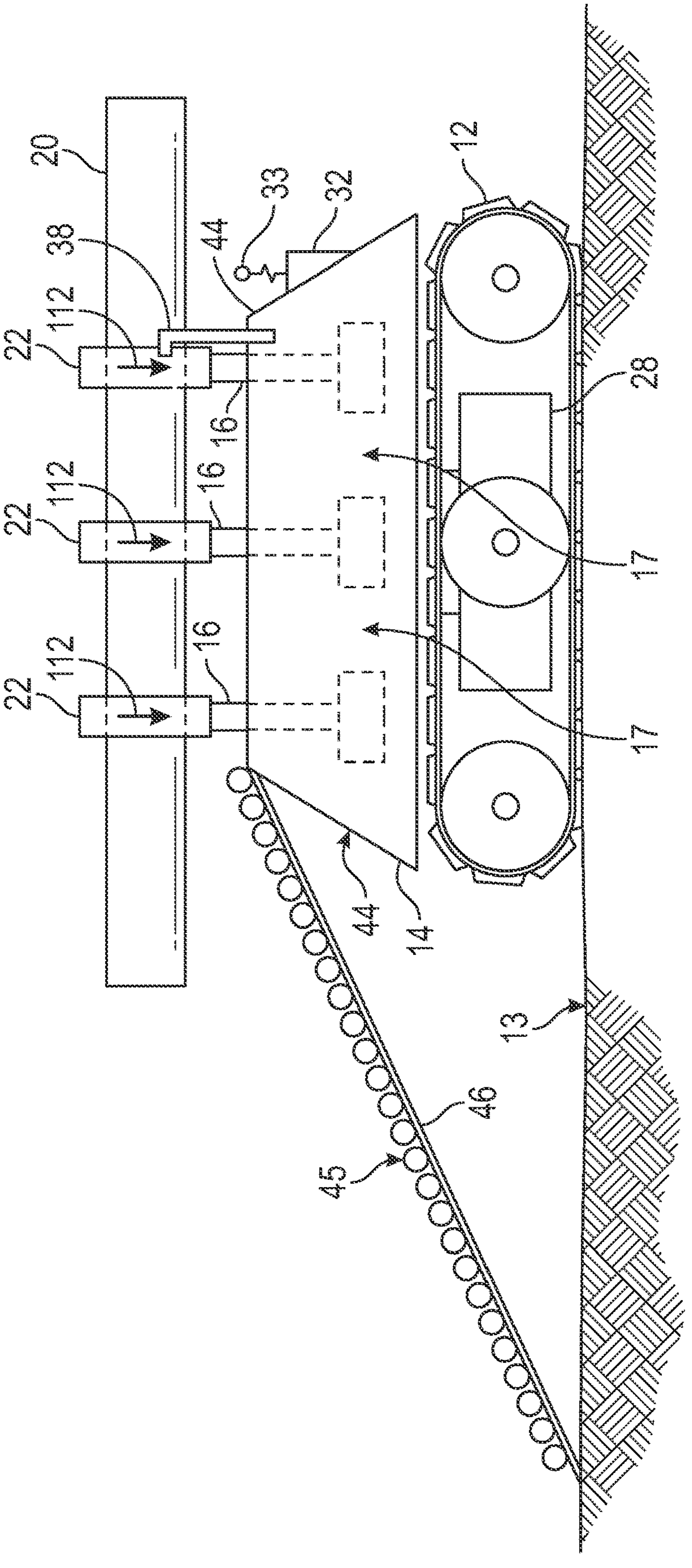
FIG. 2 is an illustration of an alternative or second embodiment of the apparatus of the invention shown from a side view having multiple 360 degree "O"-shaped or similarly closed cradle pipe holders each extending from respective multiple supports on the mobile platform of the apparatus of the invention, and showing an optional removable ramp in place for use.

In an alternative embodiment, the pipe holder is comprised of at least one 360 degree "O" shaped cradle 22 or similarly closed cradle such as a "D" (turned sideways)-cradle for example, and one embodiment of the apparatus of the invention has multiple such O-shaped cradle pipe holders 22 as shown for example in FIG. 2 (which in an end view can look like or similar to the encasing pipe holder 19 shown in FIG. 1).

Figure 3:
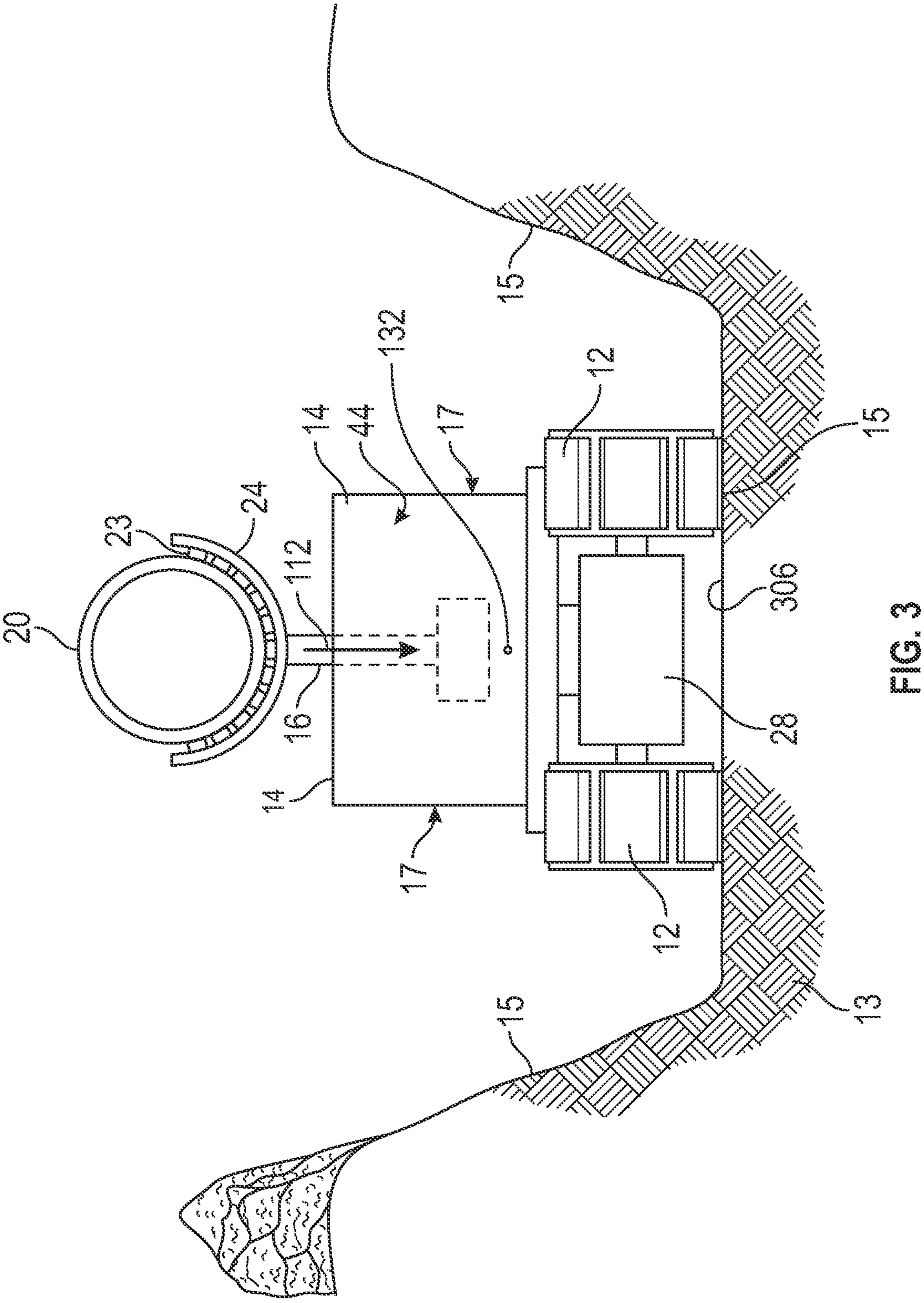
FIG. 3 is an illustration of an alternative or third embodiment of the apparatus of the invention shown from an end view having at least one open "C"-shaped cradle pipe holder extending from a support on the mobile platform of the apparatus of the invention.
Figure 4:
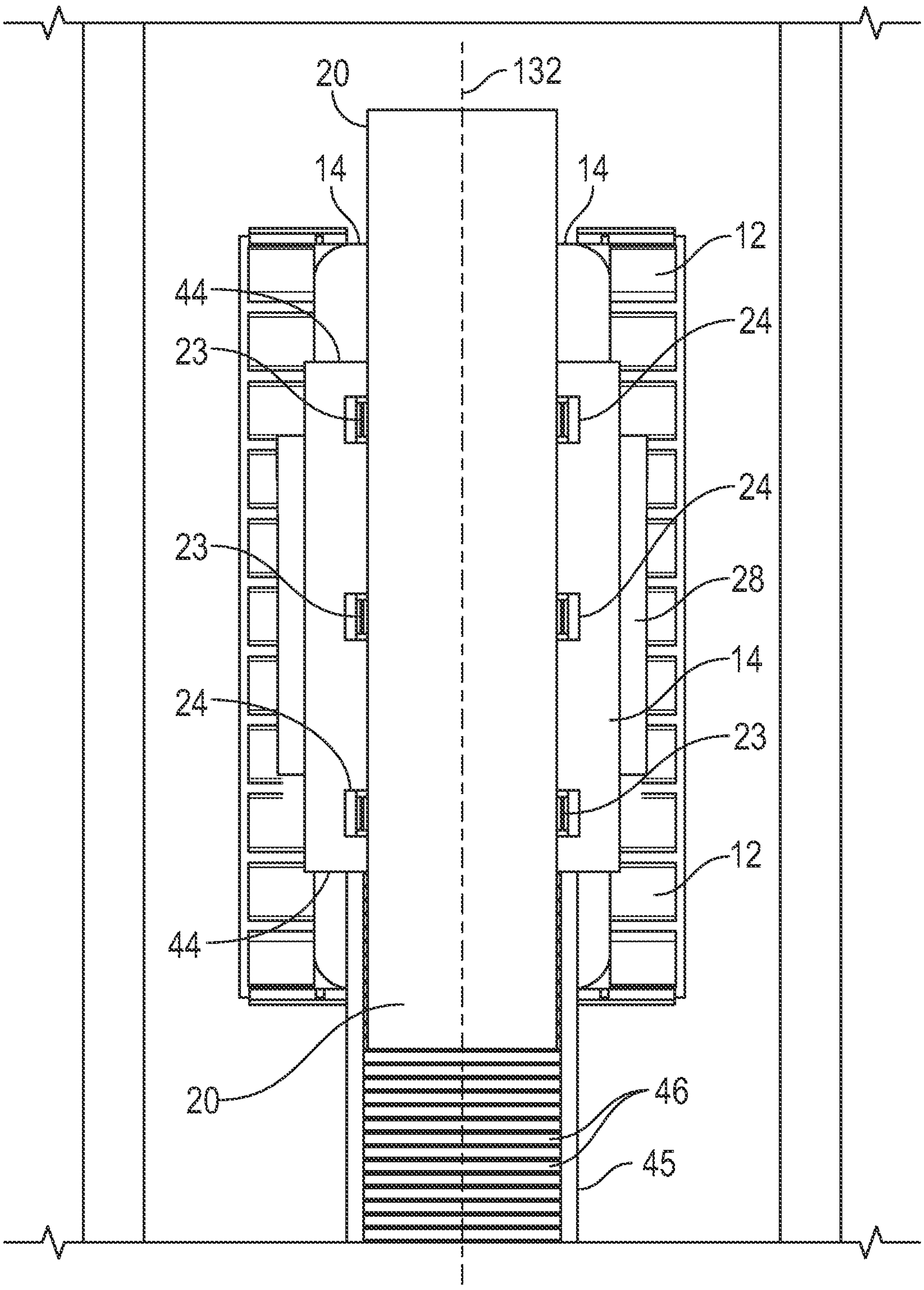
FIG. 4 is an illustration of the top view of the embodiment of the apparatus shown in FIG. 3, further showing multiple open "C"-shaped cradle pipe holders and an optional ramp in place for use.

In another alternative embodiment, the pipe holder is comprised of at least one open cup or C-shaped cradle 24 (to conform to a portion of the generally cylindrical shape of the pipe or pipe segment 20 or pipe section 60), with rollers 23, as shown for example in FIGS. 3 and 4. One embodiment of the apparatus of the invention has multiple such cup or C-shaped cradles 24 with rollers 23 as shown in FIGS. 3 and 4.

Figure 5:
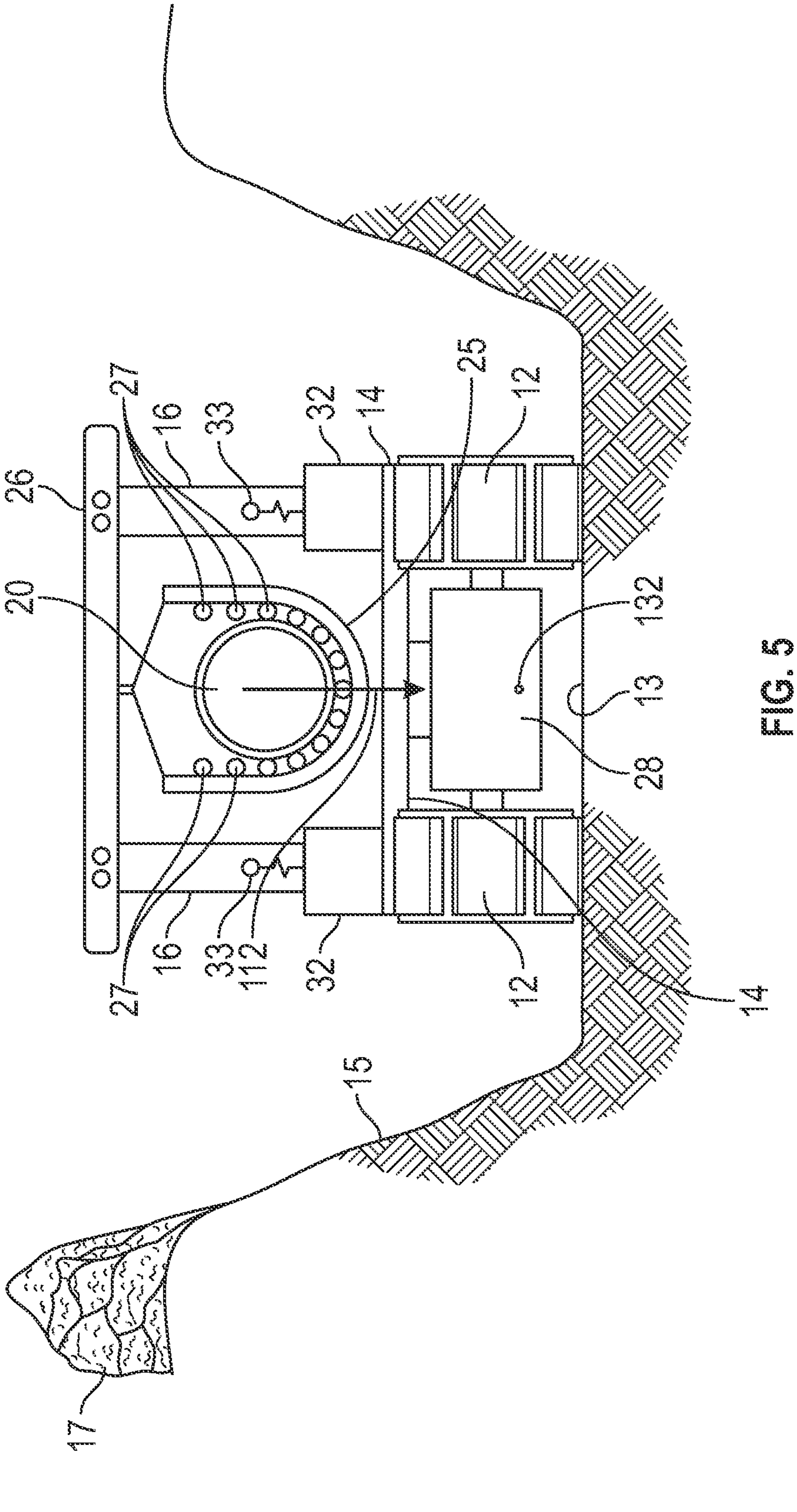
FIG. 5 is an illustration of an alternative or fourth embodiment of the apparatus of the invention shown from an end view having at least one horseshoe shaped cradle hanging from a gantry extending over at least a portion of the mobile platform and extending from at least one support on the mobile platform of the apparatus of the invention.

In still another embodiment, the pipe holder is comprised of at least one horseshoe shaped cradle 25, as shown for example in FIG. 5, and one embodiment of the apparatus of the invention has multiple such horseshoe shaped cradles 25, which can be flexible as shown in FIG. 5, or not, attached to and hanging from at least one gantry or overhanging support 26 which can extend directly from mobile platform 14 or can extend from another support extending from mobile platform 14. The presence of a gantry or overhanging support 26 does not alter the purpose of cradle 25. Horseshoe shaped cradle 25, like other pipe holders in the other embodiments, is configured to align weight 112 of pipe or pipe segment 20 or pipe section 60 with the longitudinal central axis 132 as the apparatus of the invention receives or uploads, transfers and/or transports, and unloads and/or offloads the pipe or pipe segment 20 or pipe section 60, whether the pipe holder is directly attached to the support 16 or hangs from a gantry or overhanging support 26.

FIGS. 2, 4, and 6-11, which show multiple pipe holders (and multiple corresponding supports 16), show two or three such pipe holders (and respectively two or three corresponding supports 16) for illustrative purposes. Fewer or more such pipe holders and supports could be used with adequate success. Similarly, one or multiple supports 16 could be used for the encasement pipe holder 19 shown in FIG. 1 and multiple encasement pipe holders could be alternatively used.

While the Figures illustrate a one-to-one correspondence of pipe holder to support on the mobile platform, it is also envisioned that alternatively multiple supports could support one pipe holder, and further alternatively that multiple pipe holders could be supported by one support.

In some of the embodiments of the apparatus of the invention, each support 16 is extensible or extendable, for example, via hydraulics or hydraulic cylinders. Because the pipe holder (19, 22, 24, 25 respectively in the Figures) is attached, directly or indirectly, to the distal end of the support 16, the distance of the pipe holder from the mobile platform 14 can be adjustable. Thus, for example, if desired, support 16 can be raised to receive a pipe or pipe segment 20 or a pipe section 60 onto the pipe holder(s), or can be lowered to provide a low profile for transport.

When multiple supports 16 are used, the supports 16 should preferably be independently extensible or extendable so that they can be extended in different amounts—one support 16 with respect to the other support 16—when desired so as to cause the pipe to tilt as opposed to be held parallel to the mobile platform. Such tilt, as will be discussed further below, can be used to facilitate offloading of the pipe or pipe segment or pipe section from the mobile platform in certain applications or uses of the apparatus.

When only one support 16 is used, such support 16 can be adapted to itself tilt or to have associated with it a tiltable or tilt-causing attachment so that the support 16 can cause the pipe or pipe segment or pipe section to tilt as opposed to being held parallel to the mobile platform when desired. During transport, however, the pipe or pipe segment pipe section will usually preferably be held parallel to the mobile platform.

A level sensor, associated with controller 32, senses the horizontal position of mobile platform 14 as the apparatus traverses the ground. If the ground is uneven, the level sensor can send signals to the one or more supports 16 and adjust the extension length of each support such that a pipe or pipe segment or pipe section supported by a pipe holder on or attached to or extending from the support stays horizontally level despite uneven terrain that the apparatus is traversing.

In an alternative embodiment, the mobile platform 14 is itself extensible or extendable and can tilt (at either end 44 of the apparatus rather than at either lateral side 17 of the apparatus) to raise or lower the pipe holder(s) and their support(s) 16. In this embodiment, the level sensor associated with controller 32 can send signals to the mobile platform 14 to raise, lower, or tilt the mobile platform 14 and cause the pipe holder(s) and pipe or pipe segment 20 or pipe section 60 to be raised or lowered or tilted respectively thereby.

Figure 6:
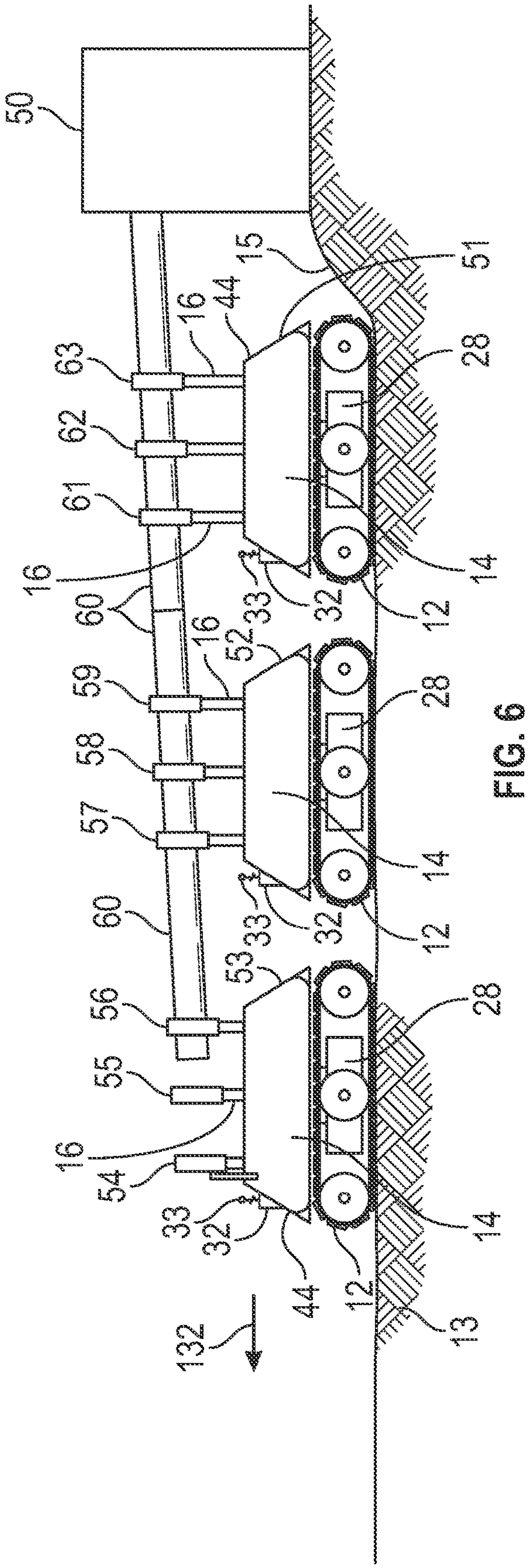
FIG. 6 is an illustration of one embodiment of the three apparatuses of the invention (also shown in FIG. 2) working in tandem to hold and carry or transport to a delivery location for pipeline placement a pipe section after receipt of the pipe section from a pipe tensioner or pipe pusher in one example application of the method of the invention.
Figure 7:
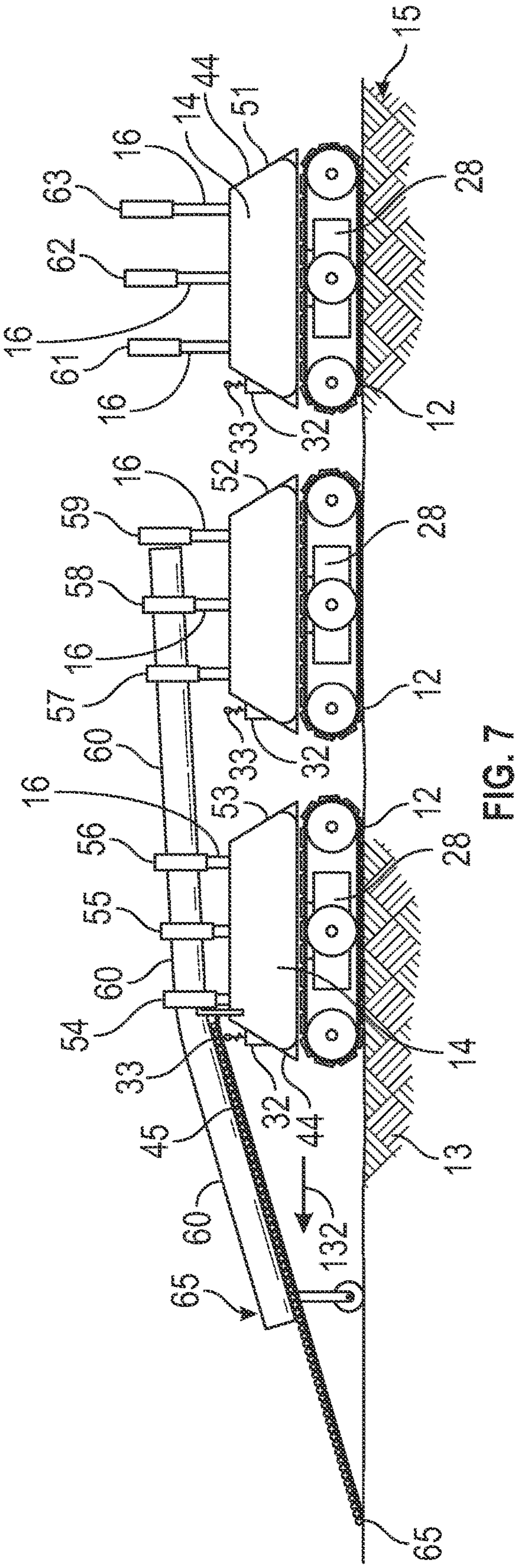
FIG. 7 is an illustration of the three apparatuses of the invention in the application shown in FIG. 6 unloading the pipe section at the delivery location.

Each pipe holder can include a low-friction surface, such as rollers 21, 23, and 27, as shown in FIGS. 1, 3, and 5 respectively, or lubrication in order to facilitate movement of pipe or pipe segment 20 or pipe section 60 through or onto the pipe holder for receipt or uploading of the pipe or pipe segment 20 or pipe section 60 onto the mobile platform and for transfer and unloading and/or offloading of the pipe or pipe segment 20 or pipe section 60 from the mobile platform of the apparatus to another apparatus, as shown for example in FIG. 6, or to the location of pipeline placement or pipe delivery, such as respectively in the bottom of a trench as shown in FIG. 7, or on a pipe collection site or supply platform for use in directional or horizontal drilling, which will be discussed further below.

As a result of such low friction surface of the pipe holder, pipe or pipe segment 20, or pipe section 60 is free to move relative to the pipe holder and to the mobile platform 14 unless restrained in some manner. Brake 38, as shown in FIG. 2, provides one example for such restraint. In this embodiment, brake 38, attached to mobile platform 14 and/or to at least one of the pipe holders, secures pipe or pipe segment 20 relative to mobile platform 14. When brake 38 is engaged, pipe or pipe segment 20 or pipe section 60 is no longer free to move relative to the pipe holder and mobile platform 14.

The apparatus of the invention can optionally include a ramp 45, as shown for example in FIGS. 2, 4, 7, 8, 9, and 11, which is preferably attachable at either end 44 of the apparatus of the invention, that is the front or the back of the apparatus, which in most embodiments of the apparatus of the invention will look similar, as shown in FIGS. 2, 4, and 6-11. Also in most embodiments of the apparatus of the invention, the front end and the back end of the apparatus can be used interchangeably or vice versa.

Unless specifically indicated otherwise herein, reference to an "end" of the apparatus of the invention means either end—the front end or the back end and vice versa. Thus end 44 in FIG. 2 is at either the front or the back of the embodiment of the apparatus of the invention shown in FIG. 2, and the end views of the embodiments of the apparatuses of the invention shown in FIGS. 1, 3, and 5 can be either the front end or the back end of the apparatuses and vice versa.

Figure 8:
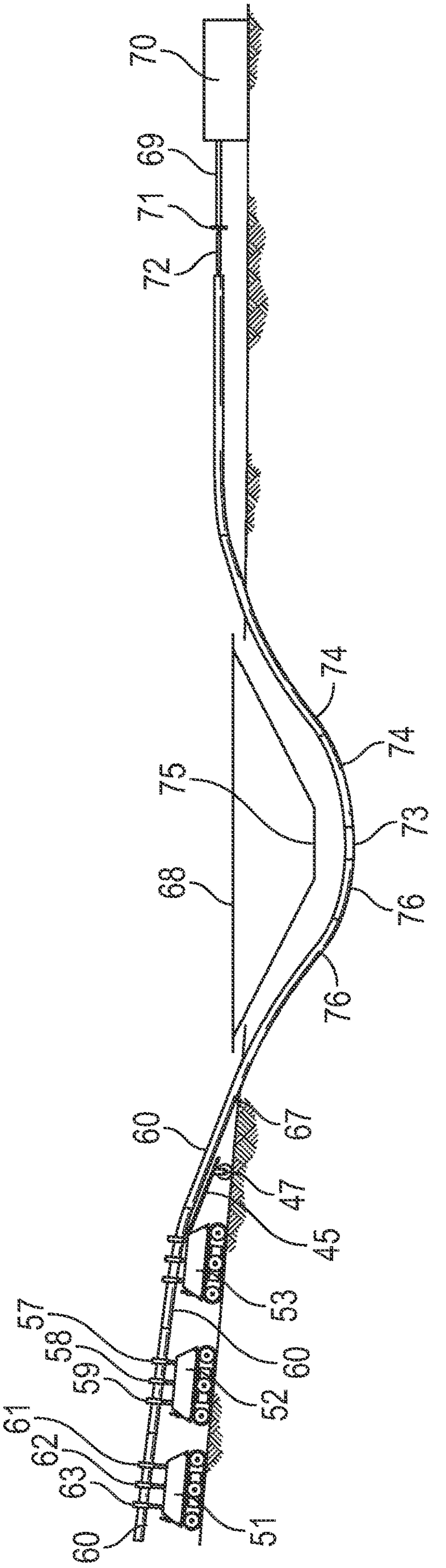
FIG. 8 is an illustration of one embodiment of the multiple apparatuses of the invention (also shown in FIGS. 2, 6 and 7) working in tandem to carry and transport a pipe section to a delivery location for placement through directional drilling under a body of water in another example application of the method of the invention.
Figure 11:
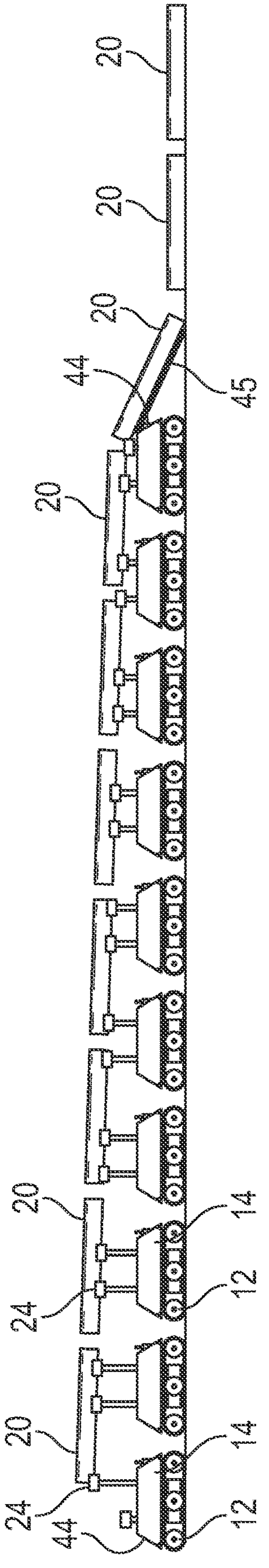
FIG. 11 is an illustration of the multiple apparatuses of the invention in the example shown in FIG. 10 unloading the pipe section at the delivery location.

When attached to an end 44 of the apparatus for use, and particularly to the mobile platform 14 at said end 44, ramp 45 extends from said mobile platform 14 to the location that the pipe or pipe segment 20 or pipe section 60 on the mobile platform 14 is to be unloaded and/or offloaded and laid or deposited, such as, for non-limiting examples, the floor of a trench or ditch for pipeline placement 65 as shown in FIG. 7, or on a pipe collection site such as in FIG. 11, or for use with directional drilling near a feed site 67 such as shown in FIG. 8 where directional drilling is used to place a pipeline under a river 68.

When unloading or offloading pipe or pipe segment 20 from mobile platform 14, pipe or pipe segment 20 slides down ramp 45 until said pipe or pipe segment 20 is in contact with the surface of the desired deposit location. Ramp 45 includes a low-friction surface. The low-friction surface of ramp 45 can be lubricated or can include slides or rollers 46, as shown in FIGS. 2 and 4. For example, rollers 46 can include ball bearings or cylindrical shaped rollers. Cylindrical shaped rollers can have a diameter in the range of, for example, 1 to 12 inches. Larger or smaller diameters are also contemplated. The low-friction surface of ramp 45 can further include bumpers or a V-shaped surface to direct the pipe or pipe segment 45 to the longitudinal middle of ramp 45.

Figure 9:
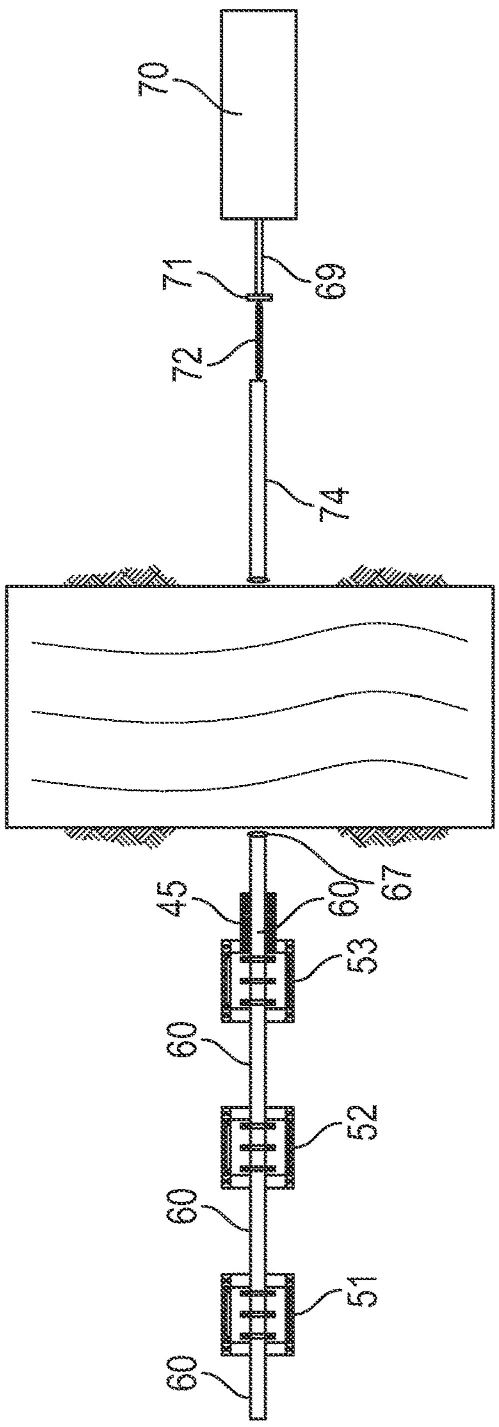
FIG. 9 is a bird's eye or overhead view of the scene in FIG. 8.

Ramp 45 can also include a wheel 47 attached to the underside of ramp 45 as shown in FIG. 8. The wheel 47 supports or helps support the weight of the ramp 45 and the pipe or pipe segment 20 or pipe section 60 when the pipe or pipe segment 20 or pipe section 60 is offloading from the mobile platform down ramp 45. Such wheel 47 is sized such that it vertically positions the end of the ramp 45 proximate the deposit location for the pipe or pipe segment 20, such as for example, a floor of a trench or ditch, or the feed site location 67 for use with pipeline placement employing directional drilling under a river 68 or body of water as shown in FIGS. 8 and 9. The wheel 47 can optionally include a wiper (not shown). The wiper would rub the wheel to remove mud, clay, or dirt that could possibly collect on the wheel.

Although it is contemplated that ramp 45, which is optional, can be used for unloading or offloading pipe or pipe segment 20 or pipe section 60 from mobile platform 14, ramp 45 can in one embodiment also be used for uploading or receiving pipe or pipe segment 20 or pipe section 60 for holding and transporting the pipe or pipe segment 20 or pipe section 60 on mobile platform 14.

Figure 10:
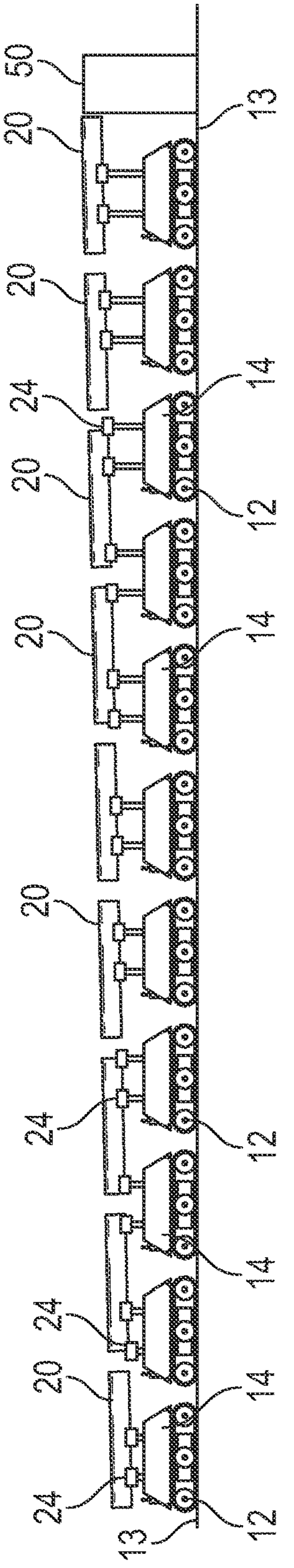
FIG. 10 is an illustration of another embodiment of multiple apparatuses of the invention (also shown in FIG. 3) working in tandem to hold and carry or transport to a delivery location for pipeline placement a pipe or pipe segment after receipt of the pipe or pipe segment from a pipe tensioner or pipe pusher in another example application of the method of the invention.

Usually, however, the pipe holder of the apparatus of the invention will receive a pipe or pipe segment 20 or pipe section 60 directly from a pipe tensioner or a pipe pusher 50, as shown for example in FIGS. 6 and 10, or similar pipe source, or from another apparatus of the invention, as shown for example in FIGS. 6-11. Transfer of pipes or pipe segments between apparatuses of the invention do not require or need use of ramp 45 when the apparatuses are positioned in tandem adjacent to one another or in sufficient proximity to one another that the pipe or pipe segment or pipe section can reach in a transfer from one apparatus to the other without risk of sag.

The apparatus of the invention receives power to be mobile from engine 28. That is, the caterpillar track or tank treads 12, powered by engine 28, provide mobility for the apparatus and its mobile platform 14. Engine 28 can be designed to operate on diesel fuel, gasoline, hydrogen, other green fuels, electrical batteries, etc. or any combination thereof.

Controller 32 enables remote operation and control of the apparatus, and can also specifically manage operation of mobile platform 14, engine 28, caterpillar tracks or tank treads 12, support(s) 16, brake 38, and when used, ramp 45. Controller 32 can be remote controlled and can be programmable. Controller 32 is mounted on the apparatus or in electrical communication with these various controllable components of the apparatus. A user can program controller 32 through the use of a remote computer or direct wired computer to operate and manage the apparatus, including the mobile platform 14, engine 32, caterpillar track or tank treads 12, support(s) 16, brake 38, and ramp 45. To manage the aforementioned components means to send signals as desired from a processor to servers or other mechanical component(s) to effect movement in the mobile platform 14, engine 32, caterpillar track or tank treads 12, support(s) 16, brake 38, and when used ramp 45.

In an illustrative example, controller 32 can be programmed to position an apparatus of the invention, or to position a plurality of apparatuses of the invention, for specific parameters of the pipe or pipe segment 20 and the intended pipeline location, such as for example a trench or ditch, or alternatively on a right away or in association with directional underground drilling (such as for pipeline placement under a river or other body of water). That is, for further example, each apparatus can be programmed to move into position based on size and weight of pipe or pipe segment 20 or pipe section 60, length and depth of the trench or ditch, or number of apparatuses in use in such trench or ditch, as shown for non-limiting examples in FIGS. 6-11.

The position of one apparatus of the invention with respect to another apparatus of the invention during operation of laying pipes or pipe segments or pipe sections at the location for a pipeline, particularly in transferring a pipe or pipe segment or pipe sections from one apparatus of the invention to an adjacent apparatus of the invention, is important in order to control sag of the pipe or pipe segment or pipe section being transported and transferred and to prevent damage to the pipe or pipe segment or pipe section.

Controller 32 includes antenna 33 which may enable a user to drive the apparatus of the invention, and control the caterpillar tracks or tank treads 12, engine 28, mobile platform 12, support(s) 16, and ramp 45 when used, with a remote controller. Controller 32 can also control signals sent from a level sensor to support(s) 16. In one embodiment, controller 32 can also control signals sent from a level sensor to mobile platform 14 where mobile platform 14 can be raised or lowered or tilted in addition to or instead of raising or lowering support(s) 16.

Controller 32 can be implemented, for example, as custom circuitry, as hardware, a hardware processor executing programmed instructions, a processor implementing software, a processor implementing firmware, or some combination thereof. Dedicated hardware elements may be referred to as "processors," "controllers," or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

An apparatus of the invention can be used alone and independently of other apparatuses of the invention, or can be used in cooperation with a plurality of like or similar apparatuses of the invention. An apparatus of the invention can receive, transfer and/or carry or transport, and deliver and unload and/or offload a single pipe, or pipe segment alone, or in cooperation with another adjacent apparatus of the invention in sufficient proximity that a single pipe or a pipe segment can extend at least in part over the respective mobile platforms of both apparatuses and can be supported in at least one pipe holder of at least one of the two apparatuses. In another application, multiple apparatuses of the invention can be positioned in tandem, end-to-end, in such close proximity that a pipe or pipe segment can be received from one adjacent apparatus and transported or transferred to another adjacent apparatus. In still another embodiment, multiple apparatuses of the invention can be positioned in end-to-end tandem and in such close proximity that a single pipe section 60, having multiple pipes or pipe segments welded together, can be carried and transported by those multiple apparatuses working together, as shown for example in FIGS. 6 and 7. In all such applications, the apparatuses of the invention maintain the pipe, pipe segment or pipe section in parallel alignment with the longitudinal central axes 132 of the apparatuses and during receipt, transfer, transport and unloading of the pipe, pipe segment, or pipe section.

FIGS. 6 and 7 illustrate how the ability of the apparatuses of the invention to work together serially in receiving, transferring, transporting and delivering pipe can be effectively used in laying pipe for a pipeline. This illustration further takes advantage of or demonstrates the small size of the apparatuses of the invention, and their ability to essentially go where a pipe can go—in a trench or ditch cut for placement of a pipeline. FIGS. 6 and 7 show apparatuses of the invention transporting a pipe section 60 from a pipe tensioner or pipe pusher 50, or other source of pipe, to a delivery location 65 in a trench or ditch 15 for intended placement of the pipe section 60 for comprising a portion of the pipeline to be laid in the ditch by three cooperating apparatuses of the invention, apparatuses 51, 52, and 53 respectively. These apparatuses are positioned in a line relative to each other such that the longitudinal central axis 132 of each is collinear one apparatus with respect to the other apparatus. The apparatuses are shown in a trench or ditch 15 but could just as easily be on a right away or on the side above the ditch or even on a utility roadway, for example. In other words, the apparatuses of the invention are versatile due to their size and structure and can generally move about on a pipeline construction site in locations that a side boom cannot.

As shown in FIG. 6, a first apparatus of the invention 51 receives at one end 44 the initial portion of the pipe section 60 from the pipe tensioner or pipe pusher 50, or other source of pipe, and transfers this portion of pipe section 60 at apparatus 51's other end 44 to adjacent apparatus 52, who receives that first portion of pipe section 60 while apparatus 51 receives the second portion of pipe section 60. Apparatus 52 then transfers that first portion of pipe section 60 to adjacent apparatus 53 while apparatus 52 receives the second portion of pipe section 60 and apparatus 51 receives the third and final portion of pipe section 60.

With pipe section 60 thus fully loaded on apparatuses 51, 52 and 53 and secured in the pipe holders 61, 62, 63, and 57, 58, 59, and 54, 55, 56 on the respective apparatuses 51, 52, and 53, and with said apparatuses having maintained the pipe section 60 in alignment with the longitudinal central axes 132 of the apparatuses and their respective mobile platforms 14 during such receipt and transfer, the apparatuses 51, 52, and 53 in cooperation together transport pipe section 60 to the delivery location in the trench 65 while continuing to maintain the pipe section 60 in alignment with the longitudinal central axes 132 of the respective apparatuses.

At the delivery location in the trench 65, as shown in FIG. 7, while continuing to maintain the pipe section 60 in alignment with the longitudinal central axis 132 of the respective apparatuses, apparatus 51, the most distal to the delivery location in the trench 65, raises the support 16 for the pipe holder 63 and thus raises pipe holder 63 higher than the other pipe holders on any of the three apparatuses. Apparatus 51 also about simultaneously similarly raises the pipe holder 62 the next highest and pipe holder 61 the next highest. At about the same time, adjacent apparatus 52 similarly raises the pipe holder 59 to be the next highest, and pipe holder 57 to be the next highest, and pipe holder 56 to be the next highest. Also at about the same time, apparatus 53, the most proximal to the delivery location in the trench 65, releases ramp 45 to extend out to delivery location 65 and raises pipe holder 56, 54, and 54 with each raised less than the one before such that pipe holder 54 is raised the least (or not at all) so the pipe holders on the three apparatuses decrease serially and substantially simultaneously in height as they near or after they reach the delivery location 65. This gradual change in the height of the pipe holders causes pipe section 60 to be higher at its distal end with respect to the delivery location 65 and gravity urges pipe section 60 to begin transfer from apparatus 53 to ramp 45 for unloading off apparatus 53 and to begin transfer from apparatus 52 to apparatus 53 and from apparatus 51 to apparatus 52. Apparatus 51 can move away from apparatus 52 as pipe section 60 unloads off apparatus 51. The transfer and movement of pipe section 60 continues toward the ramp 45 and apparatus 52 can move away as pipe section 60 unloads off apparatus 52. Apparatus 53 similarly can move away as the final portion of pipe section 60 unloads off apparatus 53 and the entire pipe section 60 is laid at delivery location 65. Throughout the receipt, transfer, transport and delivery, the weight of the pipe section 60 is aligned with the longitudinal central axes 132 of the apparatuses supporting it.

The incline for unloading of the pipe, pipe segment or pipe section should be sufficiently gradual, and the number of apparatuses sufficient for adequate proximity one to another for controlled transfer and delivery of the pipe, pipe segment or pipe section, so that such transfer and delivery of the pipe, pipe segment or pipe section occurs without sag and the pipe, pipe segment or pipe section is otherwise not damaged during the process.

The principals of the method and application of use of the apparatuses described with respect to FIGS. 6 and 7 can be similarly applied for transporting multiple pipes or pipe segments or pipe sections to a pipe holding platform for use in pipeline placement at certain locations, such as under a body of water using directional drilling equipment as shown in FIGS. 8 and 9, or for delivering multiple pipe or pipe segments to a pipeline location for connecting (i.e., welding) pipes or pipe segments at that location, and avoiding transport of the longer pipe sections.

That is, the above described method or procedure illustrated in FIGS. 6 and 7 can be effectively repeated in the method or procedure illustrated in FIGS. 8 and 9, but for delivery and downloading of pipe sections 60 into a delivery location 67 that is a feed port for using directional drilling for taking and laying pipeline under a river 68 rather than the actual surface where the pipe section will be laid for creating the pipeline.

Referring to FIGS. 8 and 9, apparatuses 51, 52, and 53 again work in tandem to deliver pipe section 60 to the delivery location 67. Pipe section 60 is then welded to another pipe section 60 to be taken under the river 68 where both pipe sections 60 will be taken by carrier pipe 76 being pulled underground under the bottom of the river 75 by drilling rig 70 and placed under that bottom of the river 75 to connect to the pipeline on the opposing side of the river. More than two pipe sections 60 may be needed for that connection, depending on the width and depth of the river 68, but the pipeline sections must be welded together before being taken by carrier pipe 76 underground under the bottom of the river 75. The carrier pipe 76 and the pipe sections 60 are preceded by a cutter/shaver 71, a swivel 72, a reamer 74, and a guide 73, also all pulled by the drilling rig 70, to make, secure, and lubricate the hole for pulling and placement of the pipe sections 60 under the river 68.

In another embodiment of this method, apparatuses of this invention are also used to first deliver pipe or pipe segments 20 to a pipe storage platform near the delivery location 67. From this pipe storage platform, the pipe or pipe segments 20 can be welded into pipe sections 60 and then the pipe sections 60 loaded onto apparatuses of the invention (using a pipe tensioner or pipe pusher 50 or similar pipe delivery equipment). The apparatuses then transport and deliver the pipe sections 60 to the delivery location 67 as above described.

While these FIGS. 6 and 7 and 8 and 9 illustrate cooperative use of three apparatuses of the invention for transport and delivery of a pipe section, the principal of operation is similarly effective for pipe segments and also for multiple pipes. Further, such cooperation can be accomplished with each apparatus carrying its own load rather than sharing a load, and transferring its load to the adjacent apparatus for delivery of a number of pipes or pipe segments in series or in sequence. Such illustrations are but examples of the physical implementations for a plurality of apparatuses of the invention, particularly with respect to transporting and laying pipes, pipe segments, and pipe sections for a pipeline.

Although three apparatuses are depicted in the examples of FIGS. 6 and 7, and FIGS. 8 and 9, the number of apparatuses needed for transporting and laying pipes, pipe segments 20 and pipe sections 60 for a pipeline is determined by the number of pipes, pipe segments, or pipe sections, or the length of joined pipe or pipe segments delivered to the apparatuses by pipe tensioners or pipe pushers 50 (or similar pipe delivery equipment), the dimensions of the pipe, pipe segments, or pipe sections, and the intended use of the pipeline. Additional or fewer apparatuses can be used, including without limitation for uses such as the ones discussed above and illustrated in FIGS. 6 and 7 and 8 and 9.

FIGS. 10 and 11 illustrate another embodiment of the method of the invention employing a plurality of apparatuses for transporting multiple pipe or pipe segments 20 for laying a pipeline. In this embodiment, a plurality of the pipe laying apparatuses of the invention are positioned in a line, end to end (i.e., tandem), at a source for or feeder of pipe or pipe segments 20 for the pipeline, such as a pipe tensioner or pipe pusher 50. As with many embodiments of the invention, each apparatus of the invention is weighted and configured to carry one pipe or pipe segment 20.

In FIGS. 10 and 11, the first apparatus, that is the apparatus most proximate the pipe tensioner or pipe pusher 50 receives from the pipe tensioner or pipe pusher 50 a first pipe or pipe segment 20 onto the pipe holders on the supports 16 on the mobile platform 14 of that first apparatus.

This first apparatus then transfers that first pipe segment from said mobile platform to the mobile platform of a second apparatus adjacent to said first apparatus, while accepting or receiving a second pipe or pipe segment 20 from the pipe tensioner or pipe pusher 50. The second apparatus transfers the first pipe or pipe segment 20 to a third apparatus adjacent the second apparatus and distal the first apparatus, while the first apparatus transfers the second pipe or pipe segment 20 to the second apparatus and the first apparatus receives a fourth pipe or pipe segment from the pipe tensioner or pipe pusher 50. The apparatuses in the line continue to receive and reciprocally transfer pipe or pipe segments 20 down the line until all the apparatuses in the line are holding a pipe or pipe segment 20, including the apparatus most distal the pipe tensioner or pipe pusher 50, as shown in FIG. 10.

Once loaded with pipe or pipe segments 20, the apparatuses in line move in tandem to the location for delivering and laying the pipe or pipe segments 20 for the pipeline, which is typically a pipe holding platform near the site the pipeline is to be laid, or the pipeline site itself, and in this illustration is a pipe holding platform from which the pipe or pipe segments 20 will be welded into pipe sections 60 for placement to make the pipeline.

As shown in FIG. 11, at the location for delivering and laying the pipe or pipe segments 20, each apparatus, again arranges in a line, end to end. The apparatus on the end of the line most proximal the location for delivering and laying the pipe or pipe segments 20 then extends or attaches ramp 45 at its end 44 most proximal the location for delivery and moves the pipe or pipe segment 20 it is carrying down ramp 45 to unload the pipe or pipe segment 20 at that delivery location.

About the same time, the apparatus adjacent this most proximal apparatus causes the pipe or pipe segment 20 it is carrying to offload to that most proximal apparatus, which in turn moves that pipe or pipe segment 20 down the ramp 45. Also at about the same time, each apparatus in line reciprocates, moving its pipe or pipe segment 20 forward toward the adjacent apparatus in the direction of the most proximal apparatus causing said most proximal apparatus to continue to unload each pipe or pipe segment 20 down the ramp 45 for deposit at the delivery location. Once the apparatus at the distal end of the line is no longer holding a pipe or pipe segment 20, as that apparatus is not positioned in the in direction to receive a pipe or pipe segment 20 from an adjacent apparatus, the apparatus leaves the line.

Once said pipe segments on the apparatuses have been delivered or laid for the pipeline, the apparatuses return to the pipe tensioner or pipe pusher 50 to repeat these steps until the pipe or pipe segment 20 delivery desired for the pipeline is complete.

The description of the different illustrative embodiments of the present invention has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the invention, the practical application, and to enable persons of ordinary skill in the art to understand the disclosure for various embodiments with various modifications as are suited to the particular use contemplated.

APPENDIX—LIST OF ELEMENTS IN DRAWINGS

12 Caterpillar tracks or tank treads
13 Soil
14 Mobile platform
15 Trench or ditch
16 Support
17 Lateral side of mobile platform
18 Dug-out soil on right of way of trench or ditch
19 Encasement pipe holder
20 Pipe or pipe segment
21 Rollers
22 O-shaped pipe holder
23 Rollers
24 C-shaped pipe holder
25 Horseshoe shaped pipe holder
26 Gantry
27 Rollers
28 Engine
32 Controller
33 Antenna associated with controller
38 Brake
44 End (interchangeable front end or back end of apparatus and mobile platform of the apparatus)
45 Ramp
46 Rollers on ramp
47 Wheel on ramp
50 Pipe tensioner or pipe pusher
51 One embodiment of an apparatus of the invention
52 One embodiment of an apparatus of the invention like apparatus 51
53 One embodiment of an apparatus of the invention like apparatus 51
54 One embodiment of a pipe holder on apparatus 53
55 One embodiment of a pipe holder on apparatus 53, like pipe holder 54
56 One embodiment of a pipe holder on apparatus 53, like pipe holder 54
57 One embodiment of a pipe holder on apparatus 52, like pipe holder 54
58 One embodiment of a pipe holder on apparatus 52, like pipe holder 54
59 One embodiment of a pipe holder on apparatus 52, like pipe holder 54
60 Pipe section
61 One embodiment of a pipe holder on apparatus 51, like pipe holder 54
62 One embodiment of a pipe holder on apparatus 51, like pipe holder 54
63 One embodiment of a pipe holder on apparatus 51, like pipe holder 54
65 Delivery location in trench for pipe section 60 for pipeline placement
67 Delivery location at rive for pipe section 60
68 River
69 Drill pipe
70 Drilling rig
71 Cutter/shaver
72 Swivel
73 Guide
74 Reamer
76 Carrier pipe
112 Weight of pipe or pipe segment or pipe section
132 Longitudinal central axis of apparatus of invention

What is claimed is:

1. A pipe transporting and laying apparatus for transporting and laying at a delivery location a pipe, pipe segment, or pipe section for a pipeline, comprising:

a mobile platform having a longitudinal central axis and a front end and a rear end for receiving and unloading the pipe, pipe segment or pipe section onto and off of the mobile platform, wherein said front end and said rear end can be used interchangeably;

at least one support configured to align a weight of the pipe, pipe segment, or pipe section with said longitudinal central axis upon receiving, holding, and transporting the pipe, pipe segment, or pipe section, and unloading the pipe, pipe segment, or pipe section at said delivery location;

at least one pipe holder with a low-friction surface extending from or associated with said at least one support for facilitating said receiving, holding, and transporting the pipe, pipe segment, or pipe section, and unloading of said pipe, pipe segment, or pipe section at said delivery location;

caterpillar track or tank treads to carry and move said apparatus;

an engine or motor configured to drive said caterpillar track or tank treads;

a programmable controller for controlling movement of said apparatus remotely; and an optional ramp for attaching to said front end or said back end of said mobile platform to aid the uploading or offloading of the pipe, pipe segment, or pipe section; wherein at least a length of the at least one support is adjustable such that a height position of the at least one support or the at least one pipe holder relative to the mobile platform is adjustable; wherein said at least one pipe holder is a cup shaped, "C"-shaped, or horseshoe shaped cradle; and wherein said at least one pipe holder is supported by said at least one support and hangs from a gantry extending over said at least one pipe holder.

2. A method of transporting a pipe, pipe segment or pipe section for a pipeline to, and laying said pipe, pipe segment, or pipe section for a pipeline at, a delivery location that is the floor of a trench or ditch, using at least one apparatus comprising:

a mobile platform having a longitudinal central axis and a front end and a rear end for receiving and unloading the pipe, pipe segment or pipe section onto and off of the mobile platform, wherein said front end and said rear end can be used interchangeably;

at least one support configured to align a weight of the pipe, pipe segment, or pipe section with said longitudinal central axis upon receiving, holding, and transporting the pipe, pipe segment, or pipe section, and unloading the pipe, pipe segment, or pipe section at said delivery location;

at least one pipe holder with a low-friction surface extending from or associated with said at least one support for facilitating said receiving, holding, and transporting the pipe, pipe segment, or pipe section, and unloading of said pipe, pipe segment, or pipe section at said delivery location;

caterpillar track or tank treads to carry and move said apparatus;

an engine or motor configured to drive said caterpillar track or tank treads;

a programmable controller for controlling movement of said apparatus remotely; and an optional ramp for attaching to said front end or said back end of said mobile platform to aid the uploading or offloading of the pipe, pipe segment, or pipe section;

wherein at least a length of the at least one support is adjustable such that a height position of the at least one support or the at least one pipe holder relative to the mobile platform is adjustable, the method comprising:

receiving and holding a pipe, pipe segment or pipe section in the at least one pipe holder extending from the at least one support on the mobile platform of said at least one apparatus, while aligning and maintaining alignment of a weight of the pipe, pipe segment, or pipe section with said longitudinal central axis;

after said receiving and holding, said at least one apparatus transporting said pipe, pipe segment, or pipe section to said delivery location, while maintaining alignment of a weight of the pipe, pipe segment, or pipe section with said longitudinal central axis;

at said delivery location, said at least one apparatus unloading said pipe, pipe segment, or pipe section at said delivery location, while maintaining alignment of a weight of the pipe, pipe segment, or pipe section with said longitudinal central axis.

3. A method of transporting a pipe, pipe segment or pipe section for a pipeline to, and laying said pipe, pipe segment, or pipe section for a pipeline at, a delivery location that is the mouth of a feed hole for introducing the pipe, pipe segment, or pipe section for placement underground using carrier pipe and a drilling rig, using at least one apparatus comprising:

a mobile platform having a longitudinal central axis and a front end and a rear end for receiving and unloading the pipe, pipe segment or pipe section onto and off of the mobile platform, wherein said front end and said rear end can be used interchangeably;

at least one support configured to align a weight of the pipe, pipe segment, or pipe section with said longitudinal central axis upon receiving, holding, and transporting the pipe, pipe segment, or pipe section, and unloading the pipe, pipe segment, or pipe section at said delivery location;

at least one pipe holder with a low-friction surface extending from or associated with said at least one support for facilitating said receiving, holding, and transporting the pipe, pipe segment, or pipe section, and unloading of said pipe, pipe segment, or pipe section at said delivery location;

caterpillar track or tank treads to carry and move said apparatus;

an engine or motor configured to drive said caterpillar track or tank treads;

a programmable controller for controlling movement of said apparatus remotely; and an optional ramp for attaching to said front end or said back end of said mobile platform to aid the uploading or offloading of the pipe, pipe segment, or pipe section;

wherein at least a length of the at least one support is adjustable such that a height position of the at least one support or the at least one pipe holder relative to the mobile platform is adjustable, the method comprising:

receiving and holding a pipe, pipe segment or pipe section in the at least one pipe holder extending from the at least one support on the mobile platform of said at least one apparatus, while aligning and maintaining alignment of a weight of the pipe, pipe segment, or pipe section with said longitudinal central axis;

after said receiving and holding, said at least one apparatus transporting said pipe, pipe segment, or pipe section to said delivery location, while maintaining alignment of a weight of the pipe, pipe segment, or pipe section with said longitudinal central axis;

at said delivery location, said at least one apparatus unloading said pipe, pipe segment, or pipe section at said delivery location, while maintaining alignment of a weight of the pipe, pipe segment, or pipe section with said longitudinal central axis.

4. A method of transporting pipes, pipe segments, or pipe sections for a pipeline to, and laying said pipes, pipe segments, or pipe sections for a pipeline at, a delivery location, using a plurality of pipe transporting and laying apparatuses comprising: a mobile platform having a longitudinal central axis and a front end and a rear end for receiving and unloading the pipe, pipe segment or pipe section onto and off of the mobile platform, wherein said front end and said rear end can be used interchangeably; at least one support configured to align a weight of the pipe, pipe segment, or pipe section with said longitudinal central axis upon receiving, holding, and transporting the pipe, pipe segment, or pipe section, and unloading the pipe, pipe segment, or pipe section at said delivery location; at least one pipe holder with a low-friction surface extending from or associated with said at least one support for facilitating said receiving, holding, and transporting the pipe, pipe segment, or pipe section, and unloading of said pipe, pipe segment, or pipe section at said delivery location; caterpillar track or tank treads to carry and move said apparatus; an engine or motor configured to drive said caterpillar track or tank treads; a programmable controller for controlling movement of said apparatus remotely; and an optional ramp for attaching to said front end or said back end of said mobile platform to aid the uploading or offloading of the pipe, pipe segment, or pipe section; and wherein at least a length of the at least one support is adjustable such that a height position of the at least one support or the at least one pipe holder relative to the mobile platform is adjustable, the method comprising:

(a) positioning at least a first apparatus, a second apparatus and a third apparatus from said plurality of apparatuses in a line relative to each other in tandem such that the longitudinal central axis of each is collinear one apparatus with respect to the other apparatus;

(b) the first of said apparatuses in said line receiving a first pipe, pipe segment or pipe section onto at least one pipe holder on at least one support on the mobile platform of said first of said apparatuses, while aligning and maintaining alignment of a weight of the pipe, pipe segment, or pipe section with said longitudinal central axis of said first of said apparatuses;

(c) said first of said apparatuses transferring said first pipe, pipe segment or pipe section to the second of said apparatuses in said line adjacent to said first apparatus, said second of said apparatuses receiving said first pipe, pipe segment or pipe section onto at least one pipe holder on at least one support on the mobile platform of said second of said apparatuses, while aligning and maintaining alignment of a weight of the pipe, pipe segment, or pipe section with said longitudinal central axis of said second of said apparatuses, while said first of said apparatuses receives a second pipe, pipe segment or pipe section onto at least one pipe holder on at least one support on the mobile platform of said first of said apparatuses, while aligning and maintaining alignment of a weight of the pipe, pipe segment, or pipe section with said longitudinal central axis of said first of said apparatuses;

(d) said second of said apparatuses transferring said first pipe, pipe segment or pipe section to the third of said apparatuses in said line adjacent to said second apparatus, said third of said apparatuses receiving said first pipe, pipe segment or pipe section onto at least one pipe holder on at least one support on the mobile platform of said third of said apparatuses, while aligning and maintaining alignment of a weight of the pipe, pipe segment, or pipe section with said longitudinal central axis of said third of said apparatuses, while said second of said apparatuses receives a second pipe, pipe segment or pipe section onto at least one pipe holder on at least one support on the mobile platform of said second of said apparatuses, while aligning and maintaining alignment of a weight of the pipe, pipe segment, or pipe section with said longitudinal central axis of said second of said apparatuses; while said first of said apparatuses receives a third pipe, pipe segment or pipe section onto at least one pipe holder on at least one support on the mobile platform of said first of said apparatuses, while aligning and maintaining alignment of a weight of the pipe, pipe segment, or pipe section with said longitudinal central axis of said first of said apparatuses, while aligning and maintaining alignment of a weight of the pipe, pipe segment, or pipe section with said longitudinal central axis of said first of said apparatuses;

(e) continuing the reciprocal receiving and transferring of additional pipe, pipe segments, or pipe sections of steps (b)-(d) among or along the line of the plurality of apparatuses until each of said apparatuses is holding a pipe, pipe segment, or pipe section;

(f) moving said line of the plurality of apparatuses toward the delivery location, with each said apparatus maintaining alignment of a weight of the pipe, pipe segment, or pipe section it is carrying with said longitudinal central axis of that apparatus;

(g) upon the plurality of apparatuses arriving at the delivery location, positioning said apparatuses in line relative to each other in tandem such that the longitudinal central axis of each is collinear one apparatus with respect to the other apparatus;

(h) having the apparatus most proximal the delivery location unload the pipe, pipe segment or pipe section on its mobile platform at the delivery location, while receiving from the next most proximal and adjacent apparatus the pipe, pipe segment or pipe section on its mobile platform;

(i) continuing said transfer of pipe, pipe segment, or pipe section from each apparatus to an adjacent apparatus in the line of plurality of apparatuses with said most proximal apparatus unloading each upon receipt at the delivery location until said most proximal apparatus has unloaded at said delivery location all pipes, pipe segments, or pipe sections that were carried by the plurality of apparatuses.

5. A method of transporting a pipe, pipe segment or pipe section for a pipeline to, and laying a pipe, pipe segment or pipe section for a pipeline at, a delivery location using more than one apparatus acting in cooperation one with the other, wherein said more than one apparatus each comprises: a mobile platform having a longitudinal central axis and a front end and a rear end for receiving and unloading the pipe, pipe segment, or pipe section onto and off of the mobile platform, wherein said front end and said rear end can be used interchangeably; at least one support configured to align a weight of the pipe, pipe segment, or pipe section with said longitudinal central axis upon receiving, holding, and transporting the pipe, pipe segment, or pipe section, and unloading the pipe, pipe segment, or pipe section at said delivery location; at least one pipe holder with a low-friction surface extending from or associated with said at least one support for facilitating said receiving, holding, and transporting the pipe, pipe segment, or pipe section, and unloading of said pipe, pipe segment, or pipe section at said delivery location; caterpillar track or tank treads to carry and move said apparatus; an engine or motor configured to drive said caterpillar track or tank treads; a programmable controller for controlling movement of said apparatus remotely; and an optional ramp for attaching to said front end or said back end of said mobile platform to aid the uploading or offloading of the pipe, pipe segment, or pipe section; and wherein at least a length of the at least one support is adjustable such that a height position of the at least one support or the at least one pipe holder relative to the mobile platform is adjustable, the method comprising:

positioning said more than one apparatus in a line relative to each other in tandem, end to end formation, such that the longitudinal central axis of each is collinear one apparatus with respect to the other apparatus(es), and in sufficient proximity one to the other such that said pipe, pipe segment or pipe section can extend from said one apparatus to at least said one other of said apparatus(es) such that said pipe, pipe segment or pipe section does not sag between the apparatuses and such that said pipe, pipe segment or pipe section is supported by at least one pipe holder on at least one support on the platform of each said one apparatus and at least said one other of said apparatus(es), while allowing said apparatuses sufficient distance between one another that they can each move without hitting the other, and then placing said pipe, pipe segment or pipe section on said apparatuses accordingly;

moving said apparatuses toward said delivery location;

unloading said pipe, pipe segment or pipe section at said delivery location by unloading the portion of said pipe, pipe segment or pipe section on one apparatus while that apparatus receives the adjacent portion of said pipe from said adjacent apparatus for downloading immediately and repeating said transfer of any other portions of said pipe, pipe segment or pipe section on any other of said apparatuses until the pipe, pipe segment or pipe section is completely delivered at said delivery location.

6. The method of claim 5 wherein said supports on said apparatuses in line in tandem, end to end, formation are raised on the apparatuses from highest to lowest so that the pipe, pipe segment, or pipe section on said supports tilts downward during said transfer and unloading without sag.

7. The method of claim 6 wherein said delivery location is a skid for feeding into horizontal drill pipe.

8. The method of claim 6 wherein said pipe, pipe segment or pipe section is laid for a pipeline by placement into carrier pipe associated with directional or horizontal drilling underground.

* * * * *